No. 730,093. PATENTED JUNE 2, 1903.
G. CHISHOLM.
MANUFACTURE OF METAL UNIONS.
APPLICATION FILED NOV. 30, 1900. RENEWED JAN. 24, 1903.
NO MODEL. 2 SHEETS—SHEET 1.
FIG. 1.
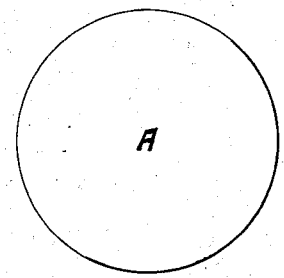
FIG. 4.
FIG. 3.
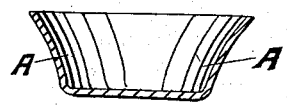
FIG. 5.
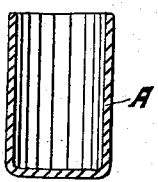
FIG. 2.
FIG. 6.
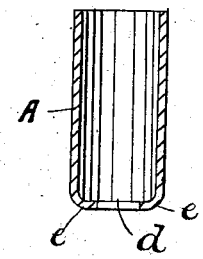
FIG. 7.
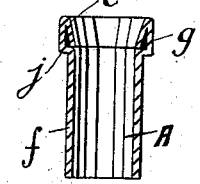
FIG. 9.
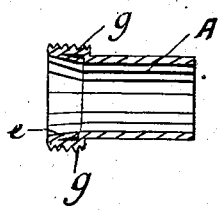
FIG. 10.
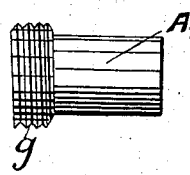
FIG. 8.
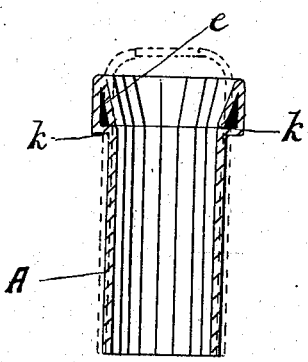
Witnesses
Inventor No. 730,093. PATENTED JUNE 2, 1903.
G. CHISHOLM.
MANUFACTURE OF METAL UNIONS.
APPLICATION FILED NOV. 30, 1900. RENEWED JAN. 24, 1903.
NO MODEL. 2 SHEETS—SHEET 2.

Witnesses

Inventor
Geo Chisholm

No. 730,093.

Patented June 2, 1903.

UNITED STATES PATENT OFFICE.

GEORGE CHISHOLM, OF BIRMINGHAM, ENGLAND.

MANUFACTURE OF METAL UNIONS.

SPECIFICATION forming part of Letters Patent No. 730,093, dated June 2, 1903.

Application filed November 30, 1900. Renewed January 24, 1903. Serial No. 140,445. (No model.)

*To all whom it may concern:*

Be it known that I, GEORGE CHISHOLM, brass-founder, a subject of the King of Great Britain, and a resident at 630 Coventry road, Birmingham, in the county of Warwick, England, have invented new and useful Improvements in and Relating to the Manufacture of Metal Unions, (for which I have applied for a patent in Great Britain, No. 19,327, dated October 29, 1900,) of which the following is a specification.

My invention has for its object improvements in and relating to the manufacture of metal unions which I form complete from sheet metal by stamping, cutting, and pressing the same into the required shape, thus reducing the cost of manufacture and producing a superior article which is free from the sand-holes so often found in cast-unions.

In order that my invention may be clearly understood and more easily carried into practice, I have appended hereunto two sheets of drawings upon which I have fully illustrated the nature of my said improvements together with the mode of carrying the same into effect.

Figure 13:
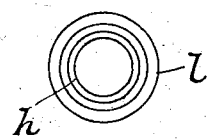
Figure 11:
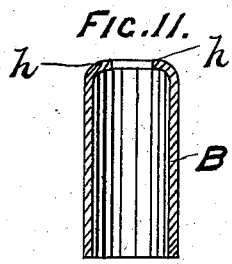
Figure 12:
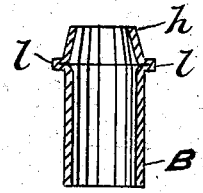
Figure 15:
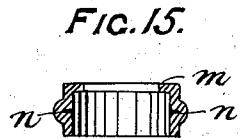
Figure 17:
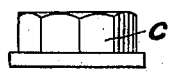
Figure 14:
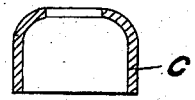
Figure 16:
Figure 19:
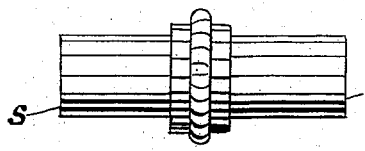
Figure 18:
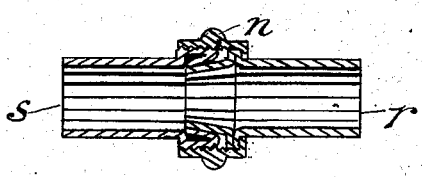
Figure 21:
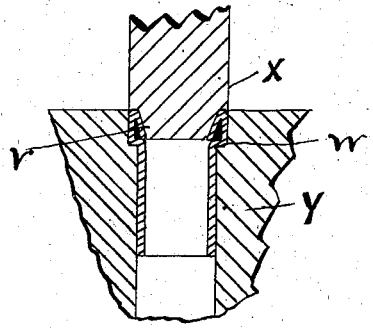
Figure 22:
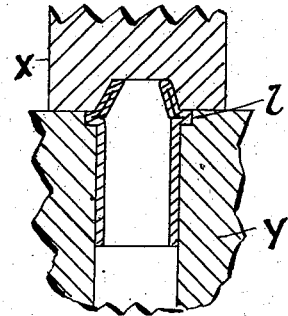
Figure 20:
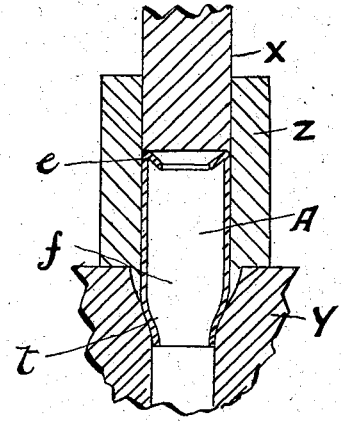

Figure 1 is a plan of the sheet-metal blank from which the connecting parts of the union are formed. Fig. 2 is an elevation of Fig. 1. Fig. 3 is a section after the first process of cupping has been effected. Fig. 4 is a similar section to Fig. 3 after the second process of cupping. Fig. 5 is also a similar section to Fig. 3, but after the third process of cupping. Fig. 6 is a section after the last cupping process has been effected and the end has been pierced. Fig. 7 is a section of the tube, illustrating the enlarged screw-head on the female part of the union. Fig. 8 is an enlargement of Figs. 6 and 7, showing in detail the mode of manufacturing the head. Fig. 9 is a similar section to Fig. 7, but showing the screw formed on the head. Fig. 10 is an elevation of Fig. 9. Fig. 11 is a section similar to Fig. 6 and from which the male part of the union is also formed. Fig. 12 is a section illustrating the formation of the male part. Fig. 13 is an end elevation of Fig. 12. Fig. 14 is a section of a tube suitable for forming the screw-collar connection. Fig. 15 is a section illustrating the formation of the screw-collar. Fig. 16 is an elevation of Fig. 15. Fig. 17 is a similar elevation to Fig. 16, but showing a modified exterior. Fig. 18 is a section through the union complete. Fig. 19 is an elevation of Fig. 18. Fig. 20 is a diagram-section illustrating the tools for making the female part. Fig. 21 is a similar section to Fig. 20, showing the tools for completing the female part; and Fig. 22 is a similar view showing the tools for making the male part.

I will first proceed to describe the manufacture of the female portion of the union, in carrying which into effect the circular blank A is cut out of sheet-brass or other suitable metal and by means of a press and tools is formed by easy processes into a cup, after which the bottom $d$ of the cup is partially cut out, thus forming a tube with the rounded flange $e$ at the end, as illustrated by Fig. 6. This tube is then placed in suitable tools, and the flange $e$ is pressed over into the form shown by Figs. 7 and 8, the head $g$ at the same time being enlarged in diameter, while the diameter of the tube part $f$ is reduced, thereby forming the shoulder $j$, against the inside of which the edge $k$ of the flange $e$ is pressed. It will thus be seen that the flange $e$ thickens out and strengthens the head $j$ where enlarged and allows the said head to be screwed, as shown, without being weakened.

The male part B of the union is formed from a pierced cup, as shown by Fig. 11, which has been manufactured in the manner described with regard to the pierced cup from which the female portion is formed, being then placed in suitable tools by which the thickened flange $h$ is pressed into the inclined form shown by Fig. 12, while at the same time the collar $l$ is pressed out all around the tube.

In the case of the screw-collar C the pierced cup is provided, as before described, and is stamped or pressed into the form shown by Fig. 15, the flange $m$ of the tube being pressed over to form the projecting rim, as shown by Fig. 15, this being effected at the same time as the projection $n$ is formed. To complete the screw-collar, the interior is tapped to fit the head of the female part A, and the projection $n$ is milled or the exterior of the collar may be pressed into the shape of a nut similar to that shown by Fig. 17. The ends $r$ and $s$ of both tubes may be tapped to receive metal pipes or left plain in the case of those used for flexible pipes.

Referring to the tools for pressing the parts of the union into the required shape, Fig. 20 shows a pair suitable for reducing the part $f$ of the connection A and which consists of the top tool X, bottom tool Y, and ring Z, the bottom tool having a rounded and reduced neck $t$, through which the part $f$ of the tube A is forced, the pressure of the top tool X at the same time further inverting the flange $e$. The tube A is then placed in the bottom die Y, Fig. 21, the top tool X having a shoulder V for forcing the metal into the enlargement $w$ for the head. In the male connection B the flange $h$ having been pressed over inward is placed in the die Y, Fig. 22, the depression of the tool X squeezing the metal outward into the recess to form the collar $l$.

Having now described my invention, what I claim as new, and desire to secure by Letters Patent, is—

1. The process of manufacture of metal unions which consists of pressing a circular blank into a substantially cup-shaped body having a circular opening in its bottom, thus forming a tube having at one end an annular flange, then pressing the flange over upon the end of the body which is expanded to form an enlarged head, the diameter of the tube part at the same time being correspondingly reduced to form a shoulder at the juncture of the tube and head parts against the inside of which the top flange is pressed, substantially as specified.

2. The process of manufacture of metal unions which consists of pressing a circular metallic blank into a substantially cup-shaped body having a circular opening in its bottom thus forming a tube having at one end an annular flange, then pressing the thickened flange into an inclined head and at the same time pressing an external collar on the tube at the juncture of the head and tube parts, substantially as specified.

3. The process of manufacture of metal unions which consists of pressing a circular blank into a substantially cup-shaped body having a circular opening in its bottom, thus forming a tube having at one end an annular flange, then pressing the flange over upon the end of the body which is expanded to form an enlarged head, the diameter of the tube part at the same time being correspondingly reduced to form a shoulder at the juncture of the tube and head parts against the inside of which the top flange is pressed, and then screw-threading the external surface of the head, substantially as specified.

4. The process of manufacture of metal unions which consists of pressing a circular metallic blank into a substantially cup-shaped body having a circular opening in its bottom, thus forming a tube having at one end an annular flange, to form a projecting rim, and at the same time forming on the other face of the tube part a semicircular bead then tapping the internal faces and milling the external surfaces, substantially as specified.

In witness whereof I have hereunto set my hand in the presence of two witnesses.

GEORGE CHISHOLM.

Witnesses:
LEWIS W. GOOLD,
WALTER H. E. BARTLAM.